United States Patent Office 3,442,793
Patented May 6, 1969

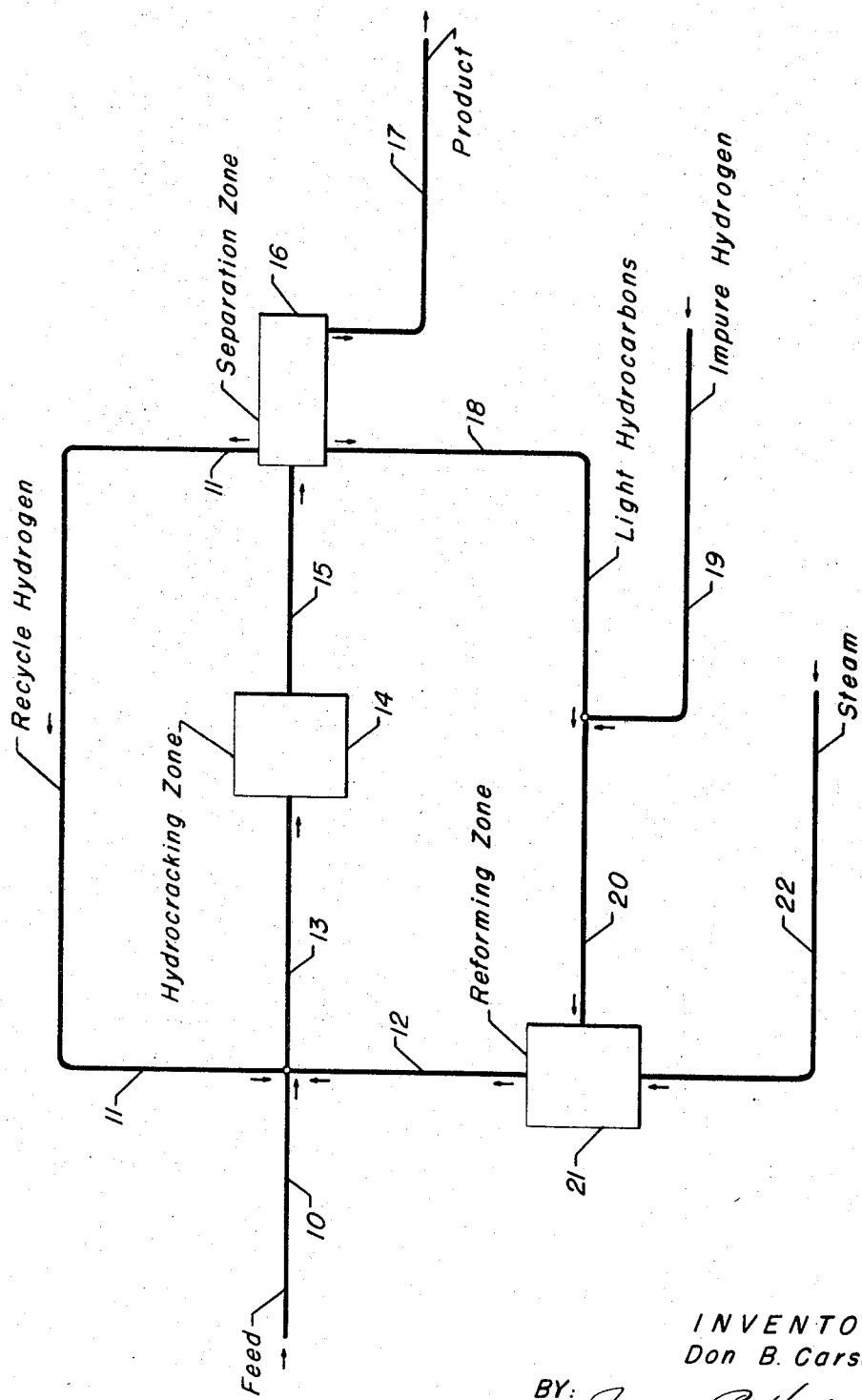

3,442,793
METHOD FOR HYDROCARBON CONVERSION
Don B. Carson, Mount Prospect, Ill., assignor to Universal Oil Products Company, Des Plaines, Ill., a corporation of Delaware
Filed Dec. 30, 1966, Ser. No. 606,134
Int. Cl. C10g 13/02
U.S. Cl. 208—108          4 Claims

ABSTRACT OF THE DISCLOSURE

Method for converting hydrocarbons in the presence of hydrogen wherein the hydrogen gas used in the reaction is derived at least in part from the light paraffinic gases separated from the effluent of the reaction zone. It is uniquely applicable for purifying hydrogen for reuse in a hydrocracking reaction by steam-reforming an impure hydrogen stream in admixture with the light paraffin gases separated from the effluent of the hydrocracking reaction zone.

---

This invention relates to a method for hydrocarbon conversion. It also relates to a method for producing gasoline boiling range products via hydrocracking. It specifically relates to a method for producing high-purity hydrogen for use in a hydrocracking reaction.

In brief, the present invention provides a method for converting hydrocarbons in the presence of hydrogen wherein the hydrogen gas used in the reaction is derived at least in part from the light paraffinic gases separated from the effluent of the reaction zone. In another aspect, the invention includes a method for purifying hydrogen for reuse in a hydrocracking reaction by steam-reforming an impure hydrogen stream in admixture with the light paraffin gases as hereinabove obtained.

The use of hydrocracking has been known to those skilled in the art as a tool for gasoline manufacture both alone and in combination with other processing steps. This reaction has the function of converting hydrocarbon materials such as naphthas, reduced heavy crude oil, still tars, and the like, into more valuable products such as gasoline, by cracking these hydrocarbons in the presence of hydrogen using a catalyst to effectuate the reaction. Since high-purity hydrogen is a requirement for an effective hydrocracking reaction, there is a need to produce hydrogen of the requisite purity from various sources within a petroleum refinery. For example, a typical source of hydrogen is the off-gas from a catalytic reforming unit. However, this hydrogen-containing stream is frequently of such low purity with respect to hydrogen that extremely large amounts of recycle gas must be circulated within the reaction zone circuit in order to maintain the hydrogen partial pressure within the reaction zone at a proper level. In many cases, on the other hand, there is not sufficient hydrogen within a refinery battery limits for carrying out the hydrocracking reaction. This, of course, requires the construction of hydrogen-producing plants, such as a steam-methane reforming operation which would charge methane gas in conjunction with steam to produce high-purity hydrogen for use in the reaction. Rarely has a separate hydrogen-producing plant charging raw materials which have to be purchased been operated on a desirable economic basis.

Accordingly, it is an object of this invention to provide a method for the conversion of hydrocarbons.

It is another object of this invention to provide a method for producing gasoline boiling range products via an improved hydrocracking process.

It is still another object of this invention to provide a method for producing high-purity hydrogen for use in a hydrocracking reaction.

It is a specific object of this invention to provide a method for hydrocracking hydrocarbons in a more facile and economical manner.

Therefore, in accordance with one embodiment of the present invention, there is provided a method for converting hydrocarbons which comprises introducing said hydrocarbons into a first catalytic conversion zone maintained under conversion conditions including the presence of hereinafter specified hydrogen stream, withdrawing from said zone an effluent stream comprising converted hydrocarbon and light gases, introducing said light gases into a second catalytic conversion zone under conditions sufficient to produce hydrogen therefrom, and passing said produced hydrogen to said first conversion zone as specified.

A particular embodiment of this invention provides a method for hydrocracking a hydrocarbon feed mixture which comprises the steps of:

(a) Introducing said feed mixture into a catalytic hydrocracking zone maintained under hydrocracking conditions including a temperature from 400° F. to 900° F., a pressure from 500 p.s.i.g. to 10,000 p.s.i.g., a liquid hourly space velocity from 0.1 to 10, and in the presence of hereinafter specified hydrogen in an amount from 1,000 to 30,000 s.c.f./b. sufficient to produce an effluent stream containing a normally liquid hydrocracked product stream and a normally gaseous paraffinic hydrocarbon fraction;

(b) Subjecting at least a portion of said gaseous fraction to catalytic reforming in the presense of steam under conditions sufficient to produce a gaseous product stream comprising from 80% to 98% hydrogen;

(c) Passing said gaseous product stream into said hydrocracking zone as specified; and (d) Recovering said hydrocracked product stream.

A more specific embodiment of this invention includes the hereinabove specified method wherein said paraffinic hydrocarbons comprise methane and ethane.

Hydrocracking is a general term, and as used herein, is applied to refining processes wherein hydrocarbon feed stocks are of relatively high molecular weight, and are converted to mixtures of hydrocarbons of lower molecular weight. Generally, the conversion reaction is carried out at an elevated temperature and pressure and in the presence of a hydrogen-affording gas. Typically, the conditions for converting hydrocarbon feed stocks into lighter (or lower boiling) hydrocarbons include a pressure in excess of 1500 p.s.i.g. with temperatures and space velocities being conventional, as those skilled in the art know well.

The feed stocks which may be satisfactorily converted in the present invention may have a wide range of compositions and may contain large concentrations of saturates in addition to aromatics. In the hydrocracking reaction, for example, saturates are hydrocracked to gasoline boiling range paraffinic hydrocarbons containing a greater than equilibrium concentration of isoparaffins in the products; while in the case of polynuclear aromatics used as a feed stock these are partially hydrogenated and then the hydrogenated ring-portion is hydrocracked to afford alkyl-substituted benzene and an isoparaffin. Most generally for the hydrocracking reaction, the feed stock will range from naphtha and kerosene through the light and heavy gas oils. A particularly suitable feed stock will be one containing paraffinic hydrocarbons of at least five carbon atoms per molecule and having an upper boiling point within the range of from 600° F. to 1100° F.

Product yields from the method of the present invention, are dependent upon the nature of the feed stock, process conditions, availability of hydrogen, and the catalyst employed in the process. It should be noted, however, that the hydrocracking conditions and the specific catalyst used, per se, form actually no part of the present invention except within the concepts described herein.

The catalyst employed in the hydrocracking reaction zone, may be selected from the various well-known hydrocracking catalyst which typically comprises a hydrogenation component and a solid acidic hydrocracking component. Preferably the hydrocracking catalyst further comprises a minor amount of an activity-controlling material which effectively provides a balance in the catalyst hydrogenation activity relative to the acidity during the overall conversion reaction. The catalyst so constituted serves a dual function; that is the catalyst is non-sensitive to the presence of substantial quantities of nitrogenous compounds and sulfurous compounds, while at the same time it is capable of effecting the destructive removal thereof, and also of converting at least a portion of those hydrocarbons boiling in the upper range of the feed stock; that is in excess of about 600° F. to about 700° F.

The catalyst used in the practice of this invention for the hydrocracking reaction preferably will comprise minor amounts of nickel, e.g. from about 0.5% to 10% by weight nickel is distinctly preferred as a catalytic component on a silica-alumina support. Therefore, as used herein, the preferred catalyst composition for the hydrocracking reaction will be referred to as a nickel-containing catalyst. Other hydrocracking catalyst known to those skilled in the art, may also be used in some cases with satisfactory results.

The catalytic composite for utilization in, for example, the hydrocracking step, may be manufactured in any suitable manner known to those skilled in the art. Thus where the catalyst utilized contains nickel, method of preparation generally involves first forming an aqueous solution of water-soluble compound of the desired metals such as nickel nitrate and nickel carbonate. The alumina particles serving as the carrier material are commingled with the aforementioned aqueous solution and subsequently dried at a temperature of about 200° F. The dried composite is then oxidized in an oxidizing atmosphere such as air, at an elevated temperature of from 1100° F. to about 1700° F. and for a period of from about two to about eight hours. The exact manner of formulating the catalytic composite is not critical and is well-known to those skilled in the art, and only general reference thereto need be mentioned herein.

The process conditions which are employed in the present invention for the hydrocracking step can be selected over a relatively wide range and are of necessity correlated according to the nature of the feed stock and according to the particular catalyst employed so as to produce a desired conversion; that is the percentage of feed stock converted to products. Satisfactory conversions are obtained with the herein described feed stocks and using the preferred nickel-containing catalyst at pressures in the range from about 500 p.s.i.g. to 10,000 p.s.i.g., e.g. from 1000 p.s.i.g. to 3000 p.s.i.g. preferably, from 1500 p.s.i.g. to 2000 p.s.i.g.; liquid hourly space velocities from 0.1 to 10, preferably from 0.7 to 1.5; and hydrogen-to-oil ratios between 1000 and 30,000 standard cubic feet per barrel (s.c.f./b.) preferably 5000 to 15,000 s.c.f./b. In each instance it is important in the practice of this invention that the process conditions be chosen in the hydrocracking step which are sufficient to effect hydrocracking thereof measured by the production of a normally gaseous paraffinic hydrocarbon fraction comprising $C_1$ to $C_3$ hydrocarbons, e.g., the conditions are chosen such that less than 5% by weight preferably from 2% to 3% by weight of $C_1$ to $C_3$ hydrocarbons are produced.

Hydrogen is consumed in the hydrocracking reaction, therefore, it is necessary to maintain an excess of hydrogen in the reaction zone. As more fully developed herein a particularly useful place to obtain hydrogen is from a previous catalytic reforming operation which is a net producer of hydrogen. Normally the hydrogen gas produced by a catalytic reformer is impure in that it contains from 40% to 70% hydrogen on a mol basis. In another fashion, the normally gaseous hydrocarbon fraction separated from the effluent of the hydrocracking reaction zone contains not only the paraffinic hydrocarbons, but in some cases cotnains a small amount of residual hydrogen. In normal operation, however, the hydrogen gas is separated from the effluent and preferably is recycled to the reaction zone.

The production of hydrogen gas, per se is well-known to those skilled in the art. For example, U.S. Patent No. 2,750,261, Ipatieff et al., teach a process for the production of hydrogen by the interaction of an aliphatic hydrocarbon and steam at elevated temperatures in the presence of catalytic material. As can be seen from the stoichiometry presented by the patentees, hydrogen and carbon dioxide are the products from the steam-cracking of hydrocarbon. Even though the early prior art processes were limited to the steam-cracking of methane, recent advances have provided techniques for the steam-cracking of liquid hydrocarbons such as a naphtha fraction derived from petroleum. Typically, hydrogen is produced in a single-stage process at temperatures below 700° C. by using a molar ratio of steam-to-hydrogen of about 10 in the presence of a catalytic component comprising nickel. Those skilled in the art are familiar with the production of hydrogen and carbon dioxide in high concentration.

For the production of hydrogen in accordance with this invention, various feed stocks may be satisfactorily used. However, it is required that at least one of the feed stocks encompass the normally gaseous paraffinic hydrocarbons which are separated from the effluent of a hydrocracking reaction zone. Other feed stocks may be used if needed and will generally comprise the impure hydrogen stream obtained from a catalytic reforming operation. Other feed stocks may be used in combination with each of the above feed stocks or may be used in conjunction with only the normally gaseous paraffinic hydrocarbons separated from the hydrocracking reaction zone. Such other feed stocks containing aliphatic and aromatic hydrocarbons from methane to higher molecular weight hydrocarbons including acyclic and alicyclic paraffinic and olefinic organic compounds such as those containing up to about 40 carbon atoms per molecule or molecular weights as high as 560. The feed stock blended with the gaseous paraffinic hydrocarbons may be hydrocarbons obtained from an extraneous source such as ethylene, ethane, propane, propylene, hexene, hexane, n-heptane and etc., admixtures thereof, including various petroleum derived fractions such as light naphtha (e.g., boiling range from about 100° F. to 250° F.), heavy naphtha (e.g., boiling range from about 200° F. to 400° F.), gas oil (e.g., boiling range from about 400° F. to 700° F.), as well as mineral oils, crude petroleum, including topped and residual oil, and refinery and coke oven gases. It is distinctly preferred in the practice of this invention that an impure hydrogen stream obtained from a catalytic reforming operation be blended with the normally gaseous paraffinic hydrocarbons separated from the hydrocracking reaction zone as feed stock to the catalytic reforming zone in the presence of steam for the production of hydrogen therefrom.

The operating conditions to effect the production of hydrogen in relatively high purity are well-known to those skilled in the art. Generally, it is a catalytic process, as noted previously, and will utilize temperatures in the range from about 600° F. to about 1800° F. Space velocities are based on methane equivalents per hour per volume of catalyst and typically will range between 50 to about 1000.

The amount of steam required to produce hydrogen is also well-known and is frequently expressed in terms of steam-to-carbon ratio which is the number of steam molecules charged to the reaction zone per atom of carbon charged. A satisfactory range of steam-to-carbon ratio will be from about 1.5 to about 5.0, for the range of feed stocks contemplated herein.

Usually the hydrogen stream produced from the catalytic reforming operation will produce a hydrogen product comprising from 80% to 98% mol percent hydrogen. Purities above or below these limits on ranges can be produced by those skilled in the art according to the needs of the process where the hydrogen is to be used. In some cases, it is technically possible to produce hydrogen in purities exceeding 98%, but rarely will this be a requirement for the process. In some cases, it is also possible to produce hydrogen purities from the catalytic reforming zone of less than 80% hydrogen, but also it is rarely economical to produce hydrogen in this manner. Therefore, it is distinctly preferable in the practice of this invention to produce a gaseous product stream comprising from 80% to 98% (mol) hydrogen from the catalytic reforming operation charging the feed stocks described herein.

Additional features and advantages of the present invention will be apparent from the description which follows with reference to the appended drawing which provides an illustrative example of one embodiment of the invention.

Referring now to the drawing, a hydrocarbon feed mixture comprising a hydrocarbon fraction boiling between 400° F. and 1000° F. is fed into the process via line 10 wherein it is admixed with a hydrogen-containing stream comprising recycled hydrogen via line 11 and high purity hydrogen produced as more fully described hereinbelow via line 12. This feed mixture plus hydrogen in an amount of about 5000 s.c.f. per barrel is charged via line 13 into a catalytic hydrocracking zone 14. Typically the operating conditions maintained in hydrocracking zone 14 include a temperature of about 700° F., a liquid hourly space velocity of about 0.75, and a pressure of about 2000 p.s.i.g. These conditions are sufficient to produce an effluent stream containing normally liquid hydrocracked product stream; that is a product stream being lower boiling than the feed material, a hydrogen-containing stream, and a normally gaseous paraffinic hydrocarbon fraction.

These various components comprise the effluent from hydrocracking zone 14 and are subsequently passed via line 15 into separation zone 16. Hydrogen gas in relatively high purity, e.g. greater than 80% (mol) hydrogen, is separated from the effluent by means known to those skilled in the art, such as absorption techniques, and recycled via line 11 to hydrocracking zone 14 in admixture with feed material entering via line 10.

A normally gaseous paraffinic hydrocarbon fraction is also recovered from separation zone 16 and comprises primarily a mixture of methane and ethane and in some instances a small amount of propane which is subsequently passed via line 18—into reforming zone 21 for the production of hydrogen therein. An impure hydrogen stream containing from 40% to 70% (mol) hydrogen, e.g. about 65% hydrogen, is blended into the light hydrocarbon stream via line 19. This mixture of hydrogen-containing streams is passed into catalytic reforming zone 21 via line 20. Steam in the proper amount is added to the reforming zone 21 via line 22. The light hydrocarbon steam mixture is reformed under conventional conditions to produce a gaseous stream comprising about 90% hydrogen in line 12, which is admixed with feed and recycled hydrogen as hereinabove described. It is to be understood that the catalytic reforming zone 21 for the production of hydrogen contains sufficient equipment including purification and separation means not shown to effectuate the production of hydrogen as specified.

Typically, in catalytic reforming zone 21, the gaseous mixture of steam and light hydrocarbons is passed at a temperature from about 1000° F. to 1500° F. over a conventional catalyst which is maintained at a temperature in excess of 1200° F. The cracked gases leaving the reaction zone contain a major proportion of hydrogen. The hydrogen is separated from the other cracked gases and recovered in high purity for use as described herein. For example, the remaining hydrocarbons if any are removed from the hydrogen via cryogenic means, e.g. low temperature separation such that a hydrogen recycle stream comprising about 90% (mol) hydrogen can be maintained in line 12.

The desired hydrocracked product is removed from separation zone 16 via line 17.

Thus it can be seen that the present invention provides a method for converting hydrocarbons in the presence of relatively high-purity hydrogen wherein the hydrogen used in the reaction is produced by a steam-reforming operation of the light paraffinic gases which were produced in the effluent from the reaction zone. In other words, the invention also includes a method for purifying hydrogen for use in a hydrocracking reaction by steam-reforming an impure hydrogen stream in admixture with the light paraffinic hydrocarbons separated from the effluent of the hydrocracking reaction zone. This interrelated and interdependent series of processing steps accomplishes a catalytic hydrocarbon conversion reaction in a more facile and economical manner than has heretofore been possible.

The invention claimed is:
1. Method for hydrocracking a hydrocarbon feed mixture which comprises the steps of:
(a) introducing said feed mixture into a catalytic hydrocracking zone maintained under hydrocracking conditions including a temperature from 400° F. to 900° F., a pressure from 500 to 10,000 p.s.i.g., a liquid hourly space velocity from 0.1 to 10.0 and in the presence of hereinafter specified hydrogen stream in an amount of from 1000 to 30,000 s.c.f./b. sufficient to produce an effluent stream containing unreacted hydrogen gas, normally gaseous hydrocarbons, and normally liquid hydrocarbons;
(b) separating said effluent stream into a hydrogen enriched gaseous fraction comprising more than 80% of hydrogen on a mole basis, a normally gaseous hydrocarbon fraction, and a normally liquid hydrocarbon fraction;
(c) admixing at least a portion of said normally gaseous hydrocarbon fraction with an added relatively impure hydrogen gas stream comprising from 40% to 70% hydrogen on a mole basis;
(d) introducing said admixture into reforming zone in the presence of steam under hydrogen producing conditions including a steam-to-carbon ratio of from about 1.5 to about 5.0 sufficient to convert said admixture into a relatively pure hydrogen stream comprising more than 80% hydrogen on a mole basis;
(e) passing relatively pure hydrogen stream of step (d) from said catalytic reforming zone into the hydrocracking zone of step (a) as the sole input of added hydrogen thereto; and,
(f) recovering the normally liquid hydrocarbon fraction of step (b).

2. Method according to claim 1 wherein a normally liquid hydrocarbon fraction is introduced into the reforming zone of step (d) together with said admixture of step (d) for the production of hydrogen as specified.

3. Method according to claim 1 wherein said feed mixture comprises a hydrocarbon fraction boiling between 400° F. and 1000° F. and the hydrogen producing conditions of step (d) include a catalyst which comprises 0.5% to 10% by weight nickel.

4. Method for hydrocracking a hydrocarbon feed mixture which comprises the steps of:
(a) introducing said feed mixture into a catalytic hydrocracking zone maintained under hydrocracking conditions including a temperature from 400° F. to 900° F., a pressure from 500 to 10,000 p.s.i.g., a liquid hourly space velocity from about 0.1 to 10.0 and in the presence of a hereinafter specified hydrogen stream in an amount of from 1000 to 30,000 s.c.f./b. sufficient to produce an effluent stream containing unreacted hydrogen gas, normally gaseous hydrocarbons, and normally liquid hydrocarbons;

(b) separating said effluent stream into a hydrogen enriched gaseous fraction comprising more than 80% hydrogen on a mole basis, a normally gaseous hydrocarbon fraction, and a normally liquid hydrocarbon fraction;

(c) admixing at least a portion of said normally gaseous hydrocarbon fraction with an added relatively impure hydrogen gas stream comprising from 40% to 70% hydrogen on a mole basis;

(d) introducing said admixture into a catalytic reforming zone containing a catalyst comprising 0.5% to 10% by weight nickel in the presence of steam under hydrogen producing conditions including a steam-to-carbon ratio of from about 1.5 to 5.0 sufficient to convert said admixture into a relatively pure hydrogen stream comprising more than 80% hydrogen on a mole basis.

(e) passing said relatively pure hydrogen stream of step (d) from said catalytic reforming zone in admixture with said hydrogen enriched gaseous fraction of step (b) into the hydrocracking zone of step (a) as the sole input of added hydrogen thereto; and, (f) recovering the normally liquid hydrocarbon fraction of step (b).

References Cited

UNITED STATES PATENTS

| | | | |
|---|---|---|---|
| 3,027,238 | 3/1962 | Watkins | 23—212 |
| 3,202,664 | 8/1965 | Brooks et al. | 260—290 |
| 3,227,769 | 1/1966 | Ch'in et al. | 260—672 |
| 3,296,118 | 1/1967 | Czajkowski et al. | 260—672 X |
| 3,175,966 | 3/1965 | Burch | 208—79 |
| 3,189,538 | 6/1965 | Pohlenz et al. | 208—60 X |

FOREIGN PATENTS

| | | |
|---|---|---|
| 859,079 | 1/1961 | Great Britain. |

OTHER REFERENCES

"VOP Brings Out Hypro Process," Chem. Eng. News, 40 (15), pp. 68–69, Apr. 16, 1962.

DELBERT E. GANTZ, *Primary Examiner.*

G. E. SCHMITKONS, *Assistant Examiner.*

U.S. Cl. X.R.

260—672